United States Patent
Anderson et al.

(10) Patent No.: US 9,765,622 B2
(45) Date of Patent: Sep. 19, 2017

(54) METHODS FOR PERFORMING GAS TURBINE ENGINE CASING REPAIRS AND REPAIRED CASES

(75) Inventors: Derek W. Anderson, Cromwell, CT (US); Kevin Nicholas Shultis, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1252 days.

(21) Appl. No.: 11/853,924

(22) Filed: Sep. 12, 2007

(65) Prior Publication Data

US 2009/0064479 A1    Mar. 12, 2009

(51) Int. Cl.
| | |
|---|---|
| F01D 5/00 | (2006.01) |
| B23P 6/00 | (2006.01) |
| F01D 25/24 | (2006.01) |
| F04D 29/64 | (2006.01) |

(52) U.S. Cl.
CPC .............. *F01D 5/005* (2013.01); *B23P 6/005* (2013.01); *F01D 25/24* (2013.01); *F04D 29/644* (2013.01); *Y10T 29/4973* (2015.01); *Y10T 29/49742* (2015.01); *Y10T 29/49748* (2015.01)

(58) Field of Classification Search
USPC ... 29/889.1, 402.01, 402.03, 402.05, 402.06, 29/402.09, 402.13, 402.16; 415/209.1
See application file for complete search history.

(56) References Cited

U.S. PATENT DOCUMENTS

| | | | |
|---|---|---|---|
| 5,193,257 A * | 3/1993 | Bowman et al. ............. 29/33 T |
| 5,549,767 A | 8/1996 | Pietruska et al. | |
| 5,739,618 A * | 4/1998 | Kleinburger et al. ........ 310/232 |
| 5,922,150 A | 7/1999 | Pietruska et al. | |
| 6,426,152 B1 | 7/2002 | Johnson et al. | |
| 6,464,128 B1 | 10/2002 | Messelling et al. | |
| 6,531,005 B1 | 3/2003 | Bezerra et al. | |
| 6,607,114 B2 * | 8/2003 | Reser et al. ................. 228/49.1 |
| 6,615,470 B2 | 9/2003 | Corderman et al. | |
| 6,892,931 B2 * | 5/2005 | Steplewski et al. .......... 228/119 |
| 6,969,826 B2 * | 11/2005 | Trewiler et al. .......... 219/137 R |
| 7,029,371 B1 * | 4/2006 | Bird ............................... 451/11 |
| 7,159,755 B2 | 1/2007 | Martins et al. | |
| 7,185,433 B2 | 3/2007 | Miller et al. | |
| 7,244,320 B2 | 7/2007 | Malley et al. | |
| 7,259,350 B2 | 8/2007 | Minor et al. | |
| 7,278,208 B2 * | 10/2007 | Le Saint et al. ............. 29/889.1 |
| 7,546,684 B2 * | 6/2009 | Caldwell et al. ............ 29/889.1 |
| 2003/0071108 A1 | 4/2003 | Reser | |

(Continued)

FOREIGN PATENT DOCUMENTS

| | | |
|---|---|---|
| EP | 1433565 | 6/2004 |
| EP | 1584402 | 10/2005 |
| EP | 1967693 | 9/2008 |

OTHER PUBLICATIONS

Replacing a Car Floor Panel, Mar. 14, 2007, all pages.*
Extended European Search reported received Mar. 1, 2012.

Primary Examiner — David Bryant
(74) Attorney, Agent, or Firm — Carlson, Gaskey & Olds, P.C.

(57) ABSTRACT

Methods for repairing gas turbine engine casings and repaired casings are provided. In this regard, a representative method for repairing a gas turbine engine casing includes: removing an annular portion of the engine casing; and attaching an annular replacement portion to the engine casing.

2 Claims, 3 Drawing Sheets

(56) References Cited

U.S. PATENT DOCUMENTS

| | | | |
|---|---|---|---|
| 2004/0084423 | A1 | 5/2004 | Grossklaus, Jr. et al. |
| 2004/0088988 | A1* | 5/2004 | Swaffar .......................... 60/752 |
| 2005/0015980 | A1 | 1/2005 | Kottilingam et al. |
| 2005/0106315 | A1 | 5/2005 | Rigney et al. |
| 2006/0277753 | A1* | 12/2006 | Ntsama-Etoundi et al. 29/889.1 |

* cited by examiner

METHODS FOR PERFORMING GAS TURBINE ENGINE CASING REPAIRS AND REPAIRED CASES

BACKGROUND

Technical Field

The disclosure generally relates to gas turbine engines.

Description of the Related Art

Gas turbine engine components typically experience harsh operating conditions such as high temperature cycling, which can result in thermal fatigue and other types of distress modes such as cracking or wear. Additionally, some engines are exposed to harsh environment conditions such as salt ingestion that can occur during transoceanic flights, for example. Due to these and other factors, gas turbine engine components can wear and/or become damaged. In this regard, repair of gas turbine engine components oftentimes involves dimensionally restoring the components.

SUMMARY

Methods for repairing gas turbine engine casings and repaired casings are provided. In this regard, an exemplary embodiment of a method for repairing a gas turbine engine casing comprises: removing an annular portion of the engine casing; and attaching an annular replacement portion to the engine casing.

Another exemplary embodiment of a method comprises: providing a salvaged engine casing; removing an annular portion of the engine casing; providing a replacement component comprising excess material; trimming the excess material of the replacement component to form a replacement portion; and attaching the replacement portion to the engine casing.

An exemplary embodiment of a repaired gas turbine engine casing comprises an annular replacement portion attached to the casing.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Methods for repairing gas turbine engine casings and repaired casings are provided, several exemplary embodiments of which will be described in detail. In some embodiments, an annular portion of an engine casing is removed and replaced. In some embodiments, attachment of the replacement is facilitated by welding, after which a heat treatment can be performed in order to reduce stresses in the vicinity of the repair site.

Figure 1:
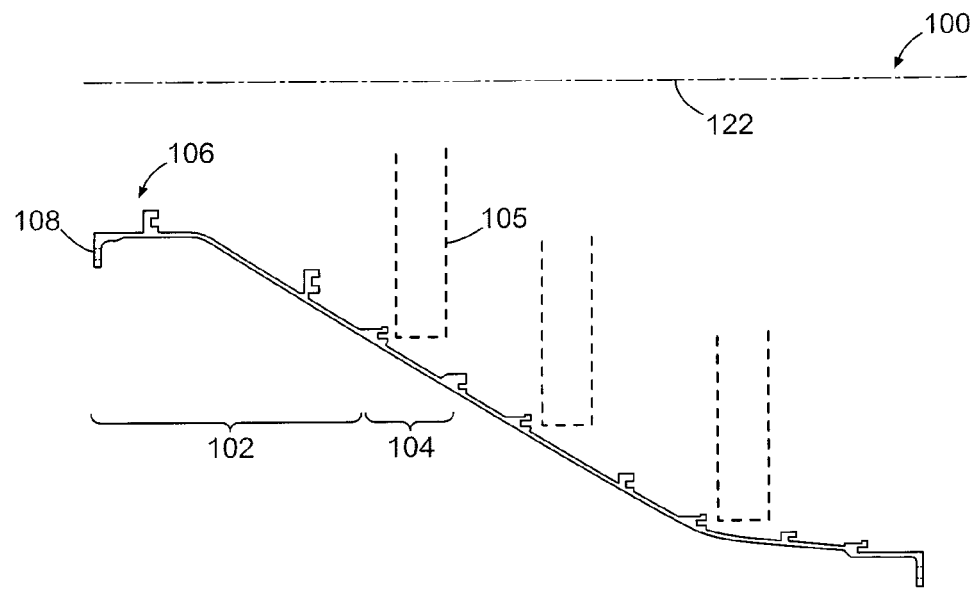
FIG. 1 is a schematic diagram depicting a portion of a representative repaired engine casing.

An exemplary embodiment of a repaired engine casing is depicted schematically in FIG. 1. As shown in FIG. 1, engine casing 100 includes non-containment zones (e.g., non-containment zone 102) and containment zones (e.g., a containment zone 104). Specifically, each containment zone is located in a vicinity of corresponding rotating blades (e.g., blade 105) of a turbine that are positioned within the casing. In this embodiment, the non-containment zone 102 is associated with a replacement portion 106 that includes a front flange 108 of the casing. The front flange is used to attach the casing to an adjacent casing. Notably, a front flange (flange 110 of FIG. 2) that was previously attached to the case was considered unsuitable for continued use, such as by exhibiting severe cracking or wear, and was removed.

Figure 2:
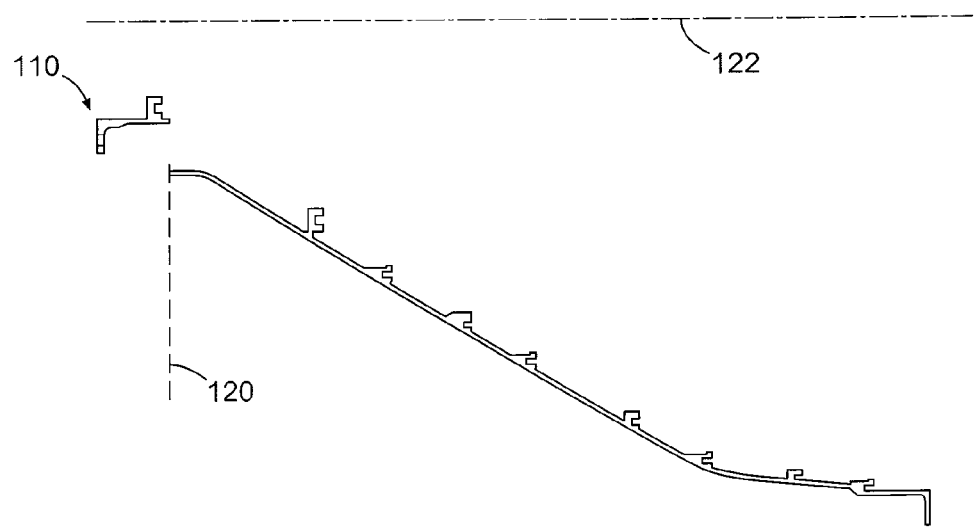
FIG. 2 is a schematic diagram depicting a step of an exemplary embodiment of a method for repairing a gas turbine engine casing.

As shown in FIG. 2, removal of front flange 110 from case is accomplished by cutting the case along the cut plane 120. The cut plane is oriented perpendicular to the longitudinal axis 122 of the casing although other cut plane orientations can be used in other embodiments. Cutting can be accomplished in various manners, such as by machining, turning, milling, sawing, or laser cutting. Notably, the cut plane is located outside of a containment zone of the casing in this embodiment. However, in other embodiments, the cut plane may be associated with a containment zone.

Figure 3:
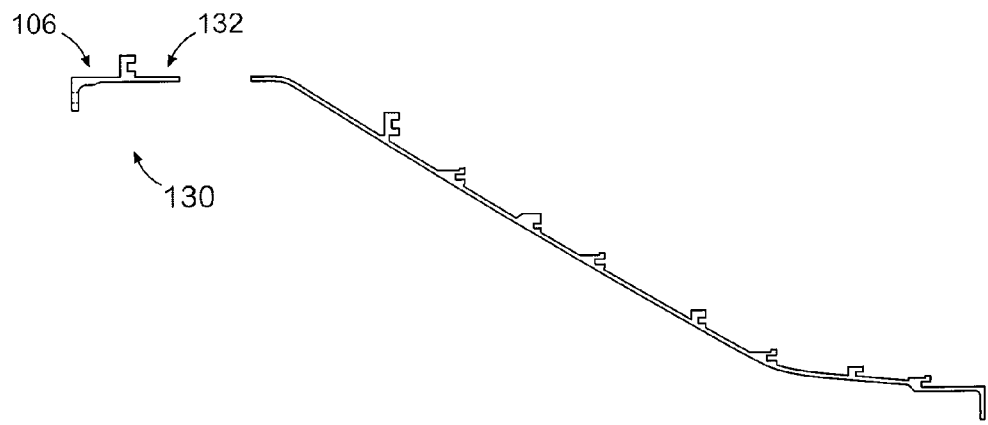
FIG. 3 is a schematic diagram depicting another step of an exemplary embodiment of method.

In FIG. 3, annular replacement component 130 is provided that includes replacement portion 106 and an optional, axially-extending trim portion 132. The trim portion is formed of excess material that can be trimmed to form an appropriate mating surface for engaging a corresponding surface of the casing 100. In this regard, the trim portion can be suitably dimensioned for attachment to the casing using various techniques, such as using a technique similar to that use in removing the front flange (shown in FIG. 2) such as creating a cut plane oriented perpendicularly to the longitudinal axis 122 of the casing. After the replacement component is trimmed, attachment to the casing 100 can be accomplished by using various techniques.

Figure 4:
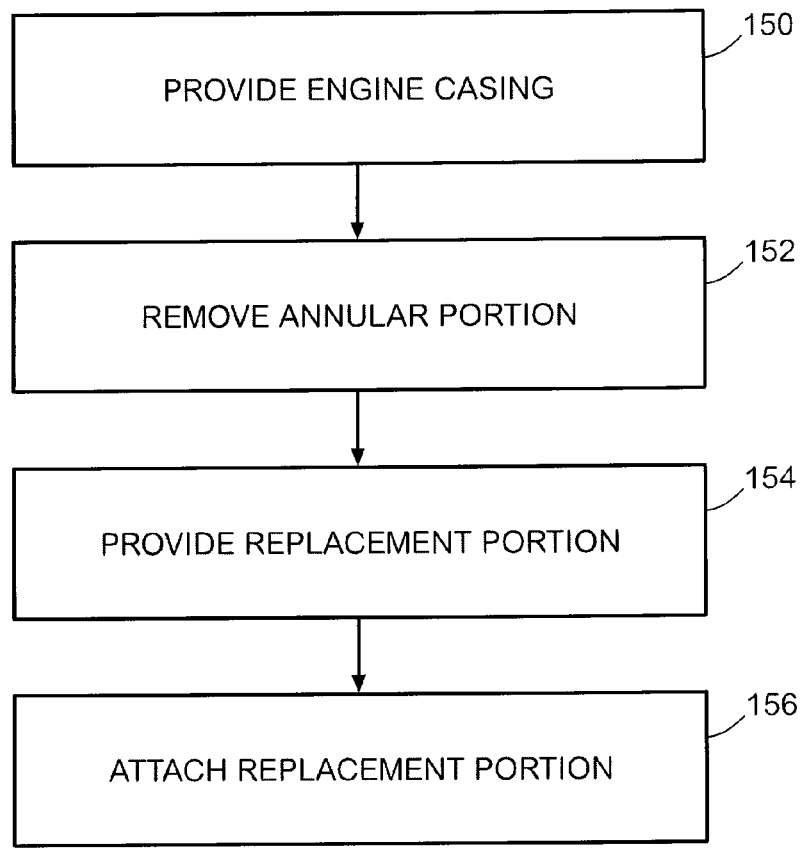
FIG. 4 is a flowchart depicting an embodiment of a method for repairing a gas turbine engine casing.

As shown in FIG. 4 an exemplary embodiment of a method for repairing a gas turbine engine casing includes providing an engine casing (block 150). In block 152, an annular portion of the engine case is removed, and a replacement portion is provided (block 154). In some embodiments, the portion removed is restricted to non-containment portion of the casing. Thereafter, such as depicted in block 156, the replacement portion is attached to the engine casing.

Figure 5:
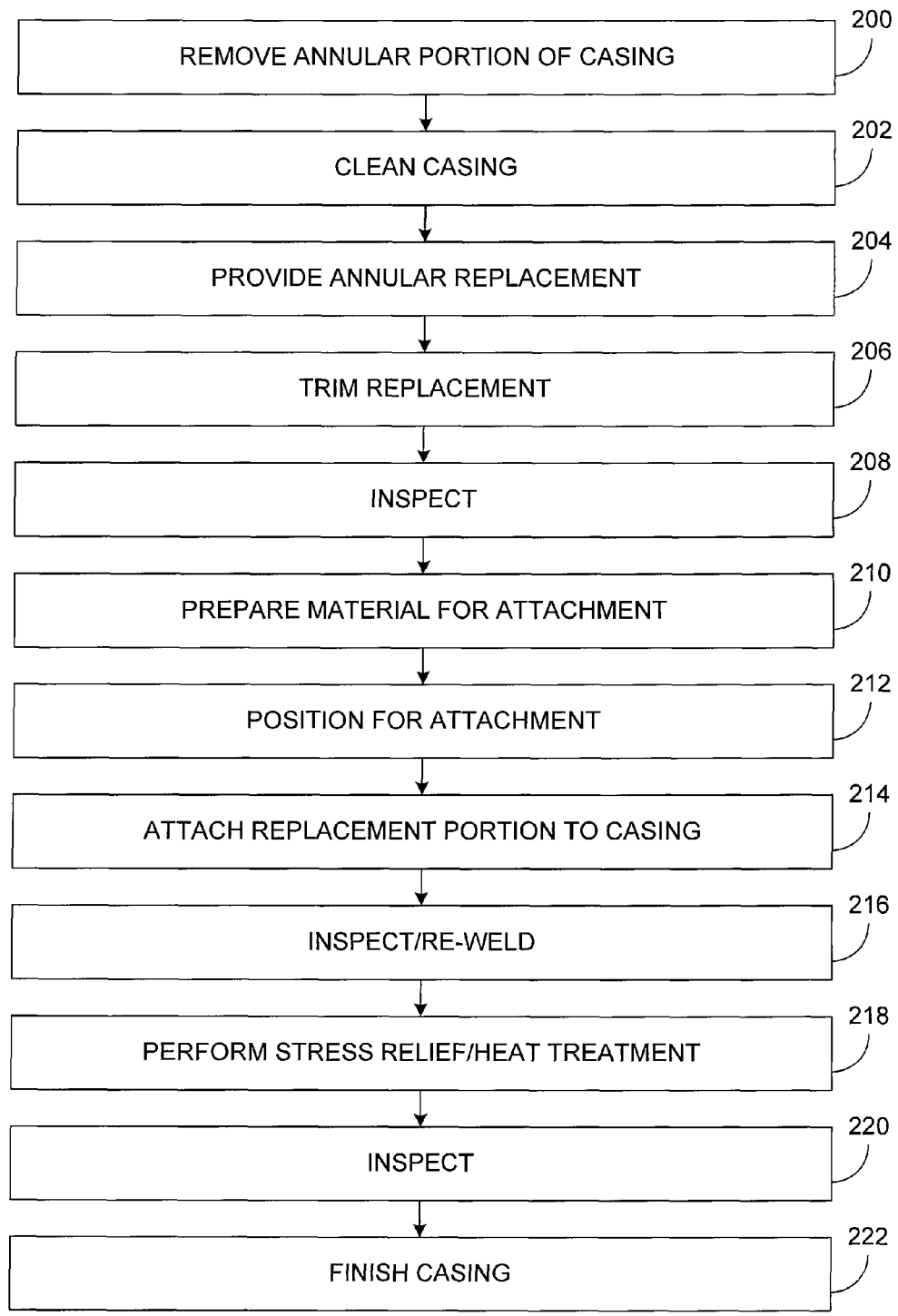
FIG. 5 is a schematic diagram depicting another embodiment of a method for repairing a gas turbine engine casing.

Another exemplary embodiment of a method for repairing a gas turbine engine casing is depicted in the flowchart of FIG. 5. As shown in FIG. 5, the method may be construed as beginning at block 200, in which an annular portion of a gas turbine engine casing is removed. By way of example, the portion can be a front flange portion of a turbine casing. In block 202, the remaining casing can be cleaned.

In block 204, a replacement component (e.g., a forged replacement flange with a trim portion) is provided and a hardness check is performed. In some embodiments, such as when the casing is a precipitation-hardened nickel alloy turbine casing, the hardness should be at least approximately HRC36 (or equivalent). If it is determined that the hardness is adequate, the process may proceed to block 206, in which the replacement component is trimmed. For instance, the replacement component can be machined (and optionally cleaned) in order to provide appropriate mating tolerance for the attachment technique that is to be used for attaching the replacement portion to the casing. In block 208, an inspection can be performed such as a fluorescent penetrant inspection, x-ray inspection and/or hardness inspection in order to identify any defects.

In block 210, material in a vicinity of the attachment can be prepared (such as by cleaning with a silicon carbide rag wheel or a stainless steel wire brush, for example) in order to prepare the mating surfaces for attachment. In some embodiments, this can involve preparing an approximately one inch wide (25.4 mm) area adjacent to the cut line at the front face of the case and the corresponding mating surface of the replacement portion. Preparation also can include additional cleaning steps in some embodiments, such as by cleaning the surfaces with a solvent wipe method.

In block 212, the replacement portion is positioned for attachment. Notably, this can involve inspection to confirm that any gaps between the replacement portion and the casing do not exceed acceptable tolerances. If tolerances are met, the process may proceed to block 214, in which the replacement portion is attached to the casing, such as by welding, for example. In this regard, various welding techniques, such as electron beam welding (EBW), machine TiG welding and plasma arc welding can be used. Inspection and optional re-welding then can be performed such as depicted in block 216. Thereafter, such as depicted in block 218, stress relief/heat treatment can be performed in order to relieve internal stresses. In block 220, various inspections, such as a hardness check, fluorescent penetrant inspection and/or x-ray inspection can be performed to insure completeness of the weld. Finishing then can be performed in block 222. By way of example, the weld can be machine finished to ensure a smooth continuous surface with no undercuts. Final cleaning and inspection then can be performed.

In some embodiments, the replacement component and salvaged casing can be heat treated (e.g., solution heat treated) prior to welding in order to soften the materials for ease of welding and to potentially prevent rework. However, there is a risk of component/casing distortion during such heat treatment that may require appropriate fixturing to prevent distortion.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for repairing gas turbine engine casing comprising:
   providing a salvaged engine casing having a longitudinal axis;
   removing an annular portion of the engine casing perpendicularly to said longitudinal axis;
   providing a replacement component including axially extending excess material;
   trimming the axially extending excess material of the replacement component prior to attachment to form a replacement portion; and
   attaching the replacement portion to the engine casing,
   wherein a radial thickness of a mate face of the replacement portion is the same as a radial thickness of a mate face of the engine casing.

2. A method for repairing a gas turbine engine casing comprising:
   removing an annular portion of the engine casing perpendicularly to a longitudinal axis of said engine casing;
   attaching an annular replacement portion to the engine casing;
   providing the replacement portion with a trim portion that is dimensioned to be trimmed perpendicularly to a longitudinal axis of said engine casing prior to attachment; and
   trimming the trim portion prior to attachment such that gap tolerances between the replacement portion of the casing are provided,
   wherein a radial thickness of a mate face of the replacement portion after the trimming is the same as a radial thickness of a mate face the engine casing.

\* \* \* \* \*